United States Patent
Narumi

Patent Number: 5,933,284
Date of Patent: Aug. 3, 1999

[54] ZOOM LENS

[75] Inventor: Rika Narumi, Hachioji, Japan

[73] Assignee: Konica Corporation, Tokyo, Japan

[21] Appl. No.: 08/935,527

[22] Filed: Sep. 23, 1997

[30] Foreign Application Priority Data

Sep. 25, 1996 [JP] Japan .................................. 8-253117

[51] Int. Cl.$^6$ .................................................. G02B 15/14
[52] U.S. Cl. .......................... 359/692; 359/713; 359/714
[58] Field of Search ..................................... 359/692, 690,
359/688, 687, 686, 683, 713–716, 708

[56] References Cited

U.S. PATENT DOCUMENTS

| | | | |
|---|---|---|---|
| 5,153,777 | 10/1992 | Okada et al. | 359/692 |
| 5,218,478 | 6/1993 | Itoh | 359/692 |
| 5,585,971 | 12/1996 | Itoh | 359/692 |
| 5,757,556 | 5/1998 | Nishimura | 359/692 |

Primary Examiner—Georgia Epps
Assistant Examiner—Jordan M. Schwartz
Attorney, Agent, or Firm—Finnegan, Henderson, Farabow, Garrett & Dunner, L.L.P.

[57] ABSTRACT

A zoom lens, comprises a first lens group, provided in an object side, having a positive refracting power; and a second lens group, provided in an image side from the first lens group, having a negative refracting power; wherein the zoom lens changes magnification by changing a distance between the first and second lens groups, the first lens group comprises a 1a lens subgroup having a negative refracting power, a diaphragm and a 1b lens subgroup having a positive refracting power all arranged in such the order from the object side to the image side; and the zoom lens satisfies the following conditions:

$$0.7 < L/f_T < 1 \qquad (1)$$

$$2.0 < f_T/f_1 < 4.2 \qquad (2)$$

$$0.1 < f_1/|f_{1a}| < 0.6 \qquad (3)$$

in which L represents a distance between the image focal point of the zoom lens and an object side surface of the first lens group at a telephoto end position, $f_T$ represents a focal length of the zoom lens at the telephoto end position, $f_1$ represents a focal length of the first lens group, and $f_{1a}$ represents a focal length of the 1a lens subgroup.

5 Claims, 8 Drawing Sheets

ZOOM LENS

BACKGROUND OF THE INVENTION

The present invention relates to a zoom lens, and more particularly, to a compact 2-group zoom lens, especially, to a zoom lens composed of less lens elements, the zoom lens is suitable for a camera lens of a lens shutter camera.

Recently, the demand for down-sizing a zoom lens of a lens shutter camera is increasing. To meet the demand, TOKKAISHO 62-90611 and TOKKAIHEI 6-160713, for example, disclose a 2-group zoom lens having therein a first lens group that is provided therein with a diaphragm and has a positive refracting power and a second lens group that has a negative refracting power both arranged in this order from the object side. In the case of an inner diaphragm type (having a diaphragm in a first lens group), it is easy to down-size a total length without making the refracting power of each group be greater, because a first lens group and a second lens group can be close sufficiently to each other at a telephoto end position.

In the conventional example mentioned above, however, there is a problem that a telephoto ratio is not less than 1 and down-sizing is not sufficient.

SUMMARY OF THE INVENTION

The present invention has been achieved in view of the problems mentioned above, and its object is to provide a compact zoom lens wherein lens structure in each lens group thereof is established appropriately, and thereby its various aberrations are corrected satisfactorily for the total range of magnifications, while having a zooming ratio of about 2–2.4 and a wide field angle.

The object mentioned above can be achieved by the following structures.

Structure 1

A zoom lens composed of a first lens group having positive refracting power and a second lens group having negative refracting power, both are arranged in this order from the object side and are changed the distance between them for changing magnification of the zoom lens, wherein the first lens group is composed of $1a$ lens subgroup having negative refracting power, a diaphragm and $1b$ lens subgroup having positive refracting power all arranged in this order from the object side, and conditional expressions of, $$0.7 < L/f_T < 1 \quad (1)$$

$$2.0 < f_T/f_1 < 4.2 \quad (2)$$

$$0.1 < f_1/|f_{1a}| < 0.6 \quad (3)$$

are satisfied, under the following conditions.

L: Distance between the image focal point and the surface of a first lens at a telephoto end position $f_T$: Focal length of the total system at a telephoto end position $f_1$: Focal length of a first lens group $f_{1a}$: Focal length of the $1a$ lens subgroup Structure 2

The zoom lens of the invention according to Structure 1, wherein the $1b$ lens subgroup has at least one aspheric surface.

Structure 3

The zoom lens of the invention mentioned above, wherein the $1b$ lens subgroup is composed of a single lens having the aspheric surfaces on both sides and having a positive refracting power.

Structure 4

The zoom lens of the invention mentioned above, wherein the second lens group is composed of (2-1)th lens which is made of plastic and has the aspheric surfaces on the single or both side and of (2-2)th lens having negative refracting power both arranged in this order from the object side.

In the invention, a diaphragm is provided in the first lens group to attain down-sizing. In the case of an inner diaphragm type wherein the first lens group has therein a diaphragm, a lens barrel tends to be complicated in terms of structure, compared with a type wherein a diaphragm is located between the first lens group and the second lens group. However, it is possible, in the inner diaphragm type, to make the distance between the two groups be small sufficiently at a telephoto end, because there is no shutter unit between the first lens group and the second lens group.

In addition to the foregoing, this inner diaphragm type prevents effectively an increase of a front lens diameter that is caused in attaining a wider field angle. Further, the first lens group in the invention is composed of $1a$ lens subgroup having a negative refracting power, a diaphragm and $1b$ lens subgroup having a positive refracting power all arranged in this order from the object side, which makes it possible for the second principal point of the first lens group to be sufficiently close to the first principal point of the second lens group in the case of telephotography. Thus, including an effect of the inner diaphragm, a sufficient amount of movement is available for the second lens group, whereby, magnification can be changed for the range from a wide angle end position to a telephoto end position without making the refracting power of each lens to be too large, which makes it possible to correct aberrations in an entire zooming area satisfactorily.

The Condition (1) stated before is a basic condition of the structure of a zoom lens whose total length at a telephoto end position is short. Namely, when the upper limit of the condition is exceeded, it is difficult to achieve the down-sizing that is the object of the invention, while, when the lower limit of the condition is exceeded, it is difficult to keep various aberrations within their allowable ranges.

The Condition (2) is one to stipulate the refracting power of the first lens group in order to make it compact, while correcting aberrations satisfactorily under the Condition (1). When the refracting power of the first lens group is made larger to exceed the upper limit, residual aberrations in the first lens group are made larger, and further, magnification of the second lens group is made larger, which makes the correction of total aberrations be difficult. When the refracting power of the first lens group is made smaller to exceed the lower limit, a total length of the lens at the telephoto end position is made larger, which makes it impossible to down-size the zoom lens. The reason for the foregoing is that the total length of the lens at the telephoto end position L is given by the following expression, when assuming that each of the first lens group and the second lens group is a single thin lens and a distance between them is represented by e.

$$L = e + f_T \{1 - (e/f_1)\}$$

The preferable is the following condition.

$$2.4 < f_T/f_1 < 3.6$$

The Condition (3) is one to stipulate the refracting power of the $1a$ lens subgroup. When the negative refracting power of the $1a$ lens subgroup is made larger to exceed the upper limit, refracting power of negative $1a$ lens subgroup and that of positive $1b$ lens subgroup both in the first lens group are made larger and sensitivity of decenters between the groups is increased, which makes the required accuracy for assembling be strict and it causes cost increase. While, when negative refracting power of the 1a lens subgroup is made smaller to exceed the lower limit, it is difficult to secure the back focal length at a wide angle end position and an effect to correct lateral chromatic aberration generated in the negative second lens group is made smaller. The preferable Conditional Expression (3) is as follows.

$$0.15 < f_1/|f_{1a}| < 0.55$$

In the invention, the 1b lens subgroup mentioned above is caused to have the aspheric surfaces on the single or both side. By making some surfaces in the vicinity of a diaphragm to be aspheric surfaces, spherical aberration of higher order and coma flare are corrected satisfactorily. In the second lens group, especially in the area on the wide angle side, there is a difference of the height of a passing ray between the paraxis and the margin. However, the use of some aspheric surfaces make it possible to correct marginal aberrations satisfactorily without affecting the aberrations on the axis. By moving distortion aberration toward the negative side by means of the aspheric surface, an increase of positive distortion aberration at the wide angle side can be prevented. In the second lens group, since the diameter of each lens is relatively large, it is preferable to provide an aspheric surface on the lens having the smallest diameter, for making the aspheric surface accurately, and for that reason, the aspheric surface is provided on the (2-1)th lens in the example.

Though plastics are easily affected by the temperature fluctuation because they generally have a greater change in refractive index for the temperature fluctuation and have a greater coefficient of thermal expansion, compared with glass, an amount of movement of a focal point position for the temperature fluctuation is made smaller by setting the refracting power of a plastic lens to be small in the invention. For achieving a small amount of movement of a focal point position, it is preferable that the relation of the refracting power of the (2-1)th lens made of plastic is in the following condition;

$$|f_2/f_{2-1}| < 0.6 \qquad (4)$$

provided that $f_2$ represents a focal length of the second lens group, and $f_{2-1}$ represents a focal length of the (2-1)th lens. When the refracting power of the (2-1)th lens is made larger to exceed the upper limit, it is difficult to control variations of an image plane and performance caused by environmental changes such as changes of temperature and humidity. The preferable is the following condition.

$$|f_2/f_{2-1}| 0.2$$

DETAILED DESCRIPTION OF THE PREFERRED EMBODIMENT

The invention will be explained in detail as follows based upon optical system structure diagrams for lens systems whose structures are shown in FIG. 1, FIG. 3, FIG. 5 and FIG. 7. Incidentally, the invention is not limited to these examples, but it can be varied variously for reduction to practice within a range wherein the essential points of the invention are not overstepped.

The lens system related to the invention is represented by a zoom lens that is composed of a first lens group having positive refracting power and a second lens group having negative refracting power both arranged in this order from the object side, a distance between the first lens group and the second lens group being varied for changing magnification, wherein the first lens group is composed of the 1a lens subgroup having negative refracting power, a diaphragm, and the 1b lens subgroup having positive refracting power.

In this case, f represents a focal length of the total system, $F_{NO}$ represents an F number, ω represents a half field angle, r represents a radius of curvature of each surface of a lens, d represents a lens thickness on an optical axis or an interval between lenses, $n_d$ represents a refractive index for d line, $\upsilon_d$ represents Abbe number, and $f_B$ represents a back focal length which is a distance from a vertex of a lens surface closest to an object to an image focal point. The symbol "*" given to the surface number shows that the surface is aspherical. The shape of the aspheric surface is expressed by following Expression 1;

Expression 1

$$X = \frac{ch^2}{1 + \sqrt{1 - (1+K)C^2 h^2}} + A_4 h^4 + A_6 h^6 + A_8 h^8 + \ldots$$

$$h = \sqrt{Y^2 + Z^2}$$

wherein, in the orthogonal coordinates system wherein a vertex of an aspheric surface is the origin and X axis is in the direction of an optical axis, C represents a vertex curvature, K represents a conical constant and Ai (i=4, 6, 8, . . . ) represents an aspheric surface coefficient.

EXAMPLE 1

Figure 1:
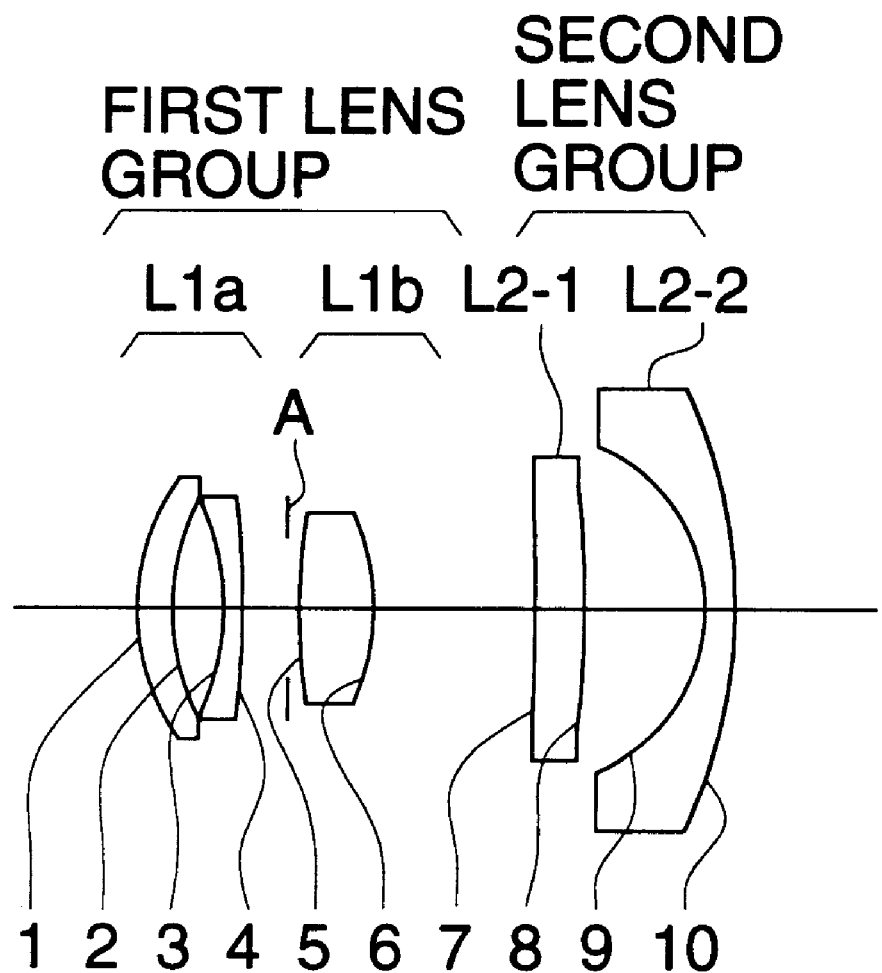
FIG. 1 is a sectional view of an optical axis of a lens corresponding to Example 1.
Figure 2:
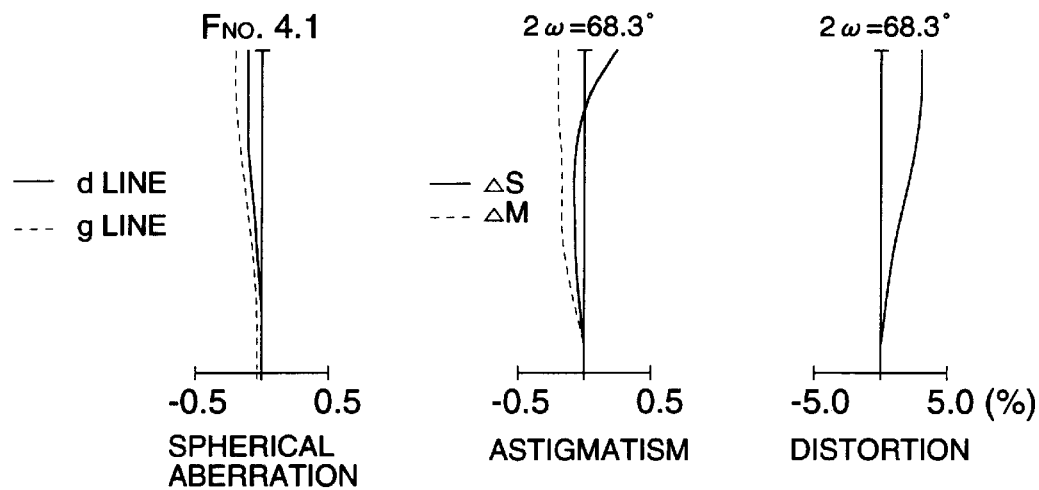
FIGS. 2(a), 2(b) and 2(c) show aberration diagrams for spherical aberration, astigmatism and distortion aberration for each of wide angle end FIG. 2(a), intermediate area FIG. 2(b) and telephoto end FIG. 2(c) corresponding to Example 1.
Figure 2:
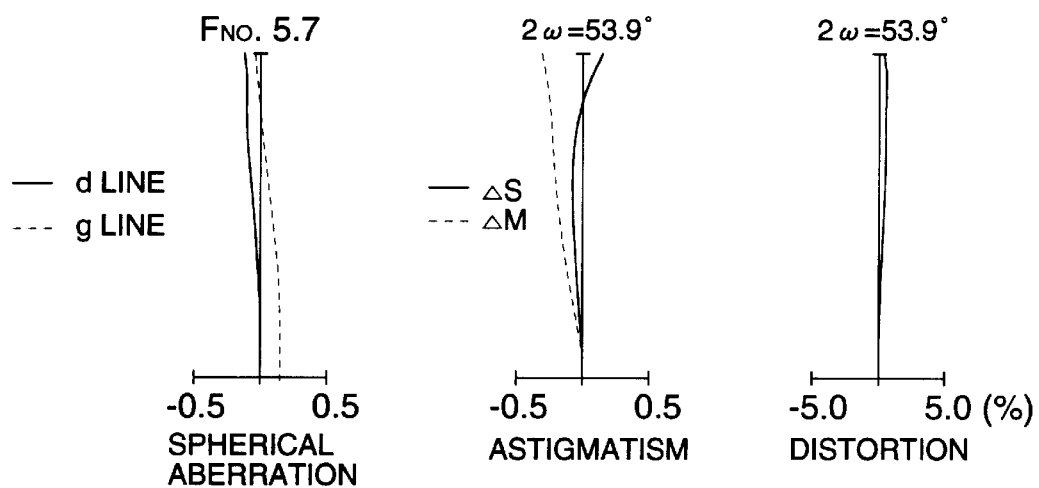
Figure 2:
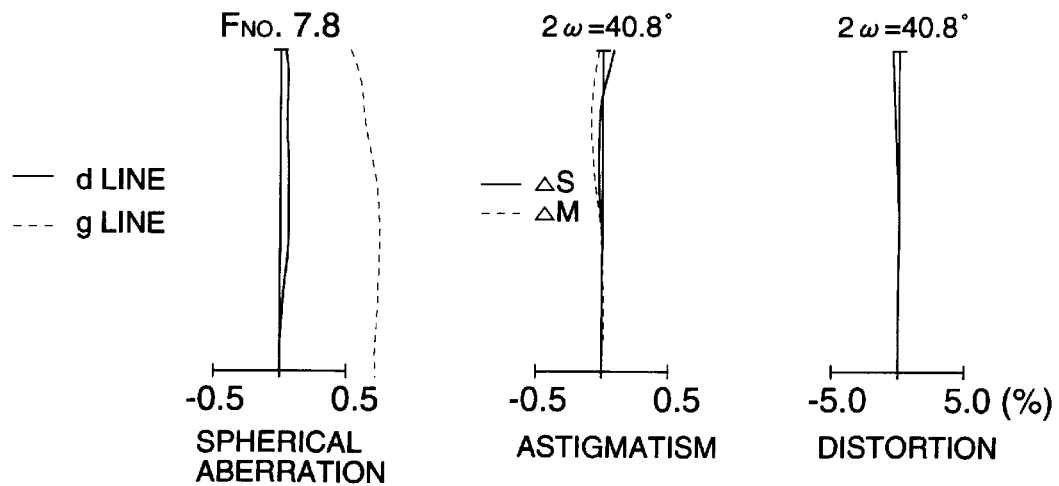

FIG. 1 is a sectional view of an optical axis of a lens corresponding to Example 1, and FIG. 2 shows aberration diagrams for spherical aberration, astigmatism and distortion for each of wide angle end position (a), intermediate position (b) and telephoto end position (c) corresponding to Example 1.

In FIG. 1, the 1b lens subgroup is composed of a single positive lens. Optical data are shown in "Table 1" and "Table 2".

TABLE 1

$f = 24.6 - 33.9 - 46.7$
$F_{NO.} = 4.1 - 5.7 - 7.8$
$2\omega = 68.3° - 53.9° - 40.8°$
$f_B = 5.7 - 14.7 - 27.0$

| Surface No. | r | d | $n_d$ | $v_d$ |
|---|---|---|---|---|
| 1 | 9.134 | 1.50 | 1.54814 | 45.8 |
| 2 | 11.591 | 1.90 | | |
| 3 | −13.355 | 0.70 | 1.80518 | 25.4 |
| 4 | −57.507 | 2.50 | | |
| 5* | 19.365 | 3.00 | 1.58313 | 59.5 |
| 6* | −10.632 | 6.70 − 3.46 − 1.10 | | |
| 7* | −36.638 | 2.00 | 1.49700 | 55.8 |
| 8* | −37.400 | 5.02 | | |
| 9 | −7.821 | 1.10 | 1.72916 | 54.7 |
| 10 | −22.153 | | | |

"*" given to Surface No. represents an aspheric surface. A diaphragm is located 2.1 mm behind the 4th surface.

TABLE 2

| Surface No. | Aspheric surface coefficient |
|---|---|
| 5th surface | K = 0.0<br>A4 = 3.55590 × 10⁻⁴<br>A6 = −1.59678 × 10⁻⁵<br>A8 = 5.85032 × 10⁻⁷<br>A10 = −4.68799 × 10⁻⁸ |
| 6th surface | K = 0.0<br>A4 = −4.98895 × 10⁻⁵<br>A6 = −1.38253 × 10⁻⁵<br>A8 = 6.15923 × 10⁻⁷<br>A10 = −4.01522 × 10⁻⁸ |
| 7th surface | K = 0.0<br>A4 = 2.07113 × 10⁻⁴<br>A6 = 7.66979 × 10⁻⁶<br>A8 = −2.49047 × 10⁻⁷<br>A10 = 3.08102 × 10⁻⁹ |
| 8th surface | K = 0.0<br>A4 = 8.23996 × 10⁻⁵<br>A6 = 5.53243 × 10⁻⁶<br>A8 = −1.43795 × 10⁻⁷<br>A10 = 1.51245 × 10⁻⁹ |

As shown in FIG. 2, all aberrations are corrected satisfactorily, resulting in an excellent lens system.

EXAMPLE 2

Figure 3:
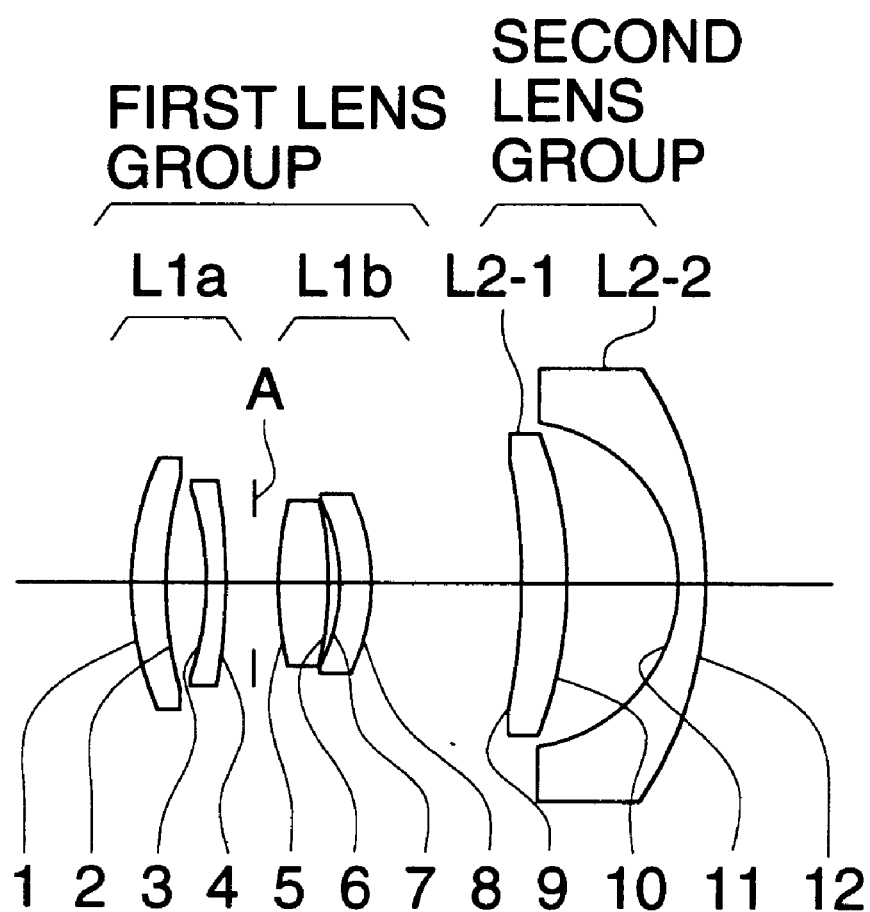
FIG. 3 is a sectional view of an optical axis of a lens corresponding to Example 2.
Figure 4:
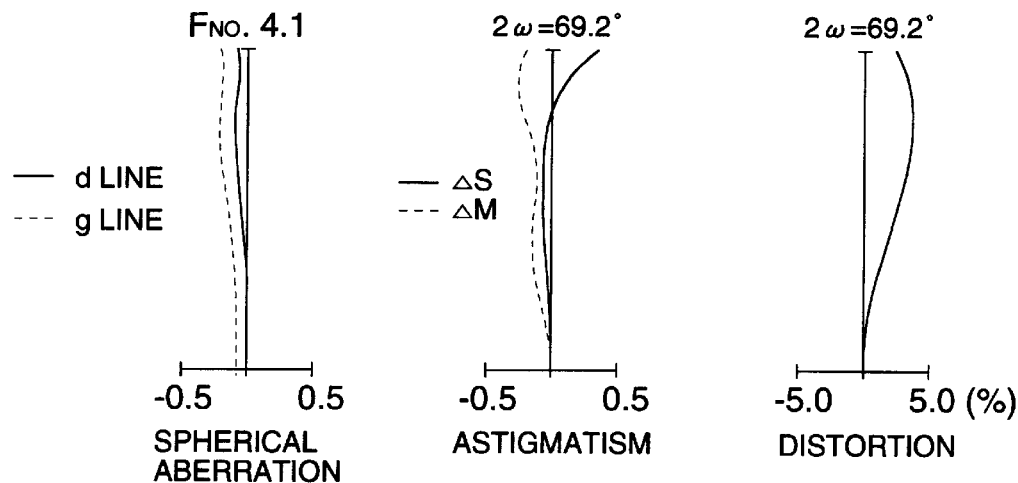
FIGS. 4(a), 4(b) and 4(c) show aberration diagrams for spherical aberration, astigmatism and distortion aberration for each of wide angle end FIG. 4(a), intermediate area FIG. 4(b) and telephoto end FIG. 4(c) corresponding to Example 2.
Figure 4:
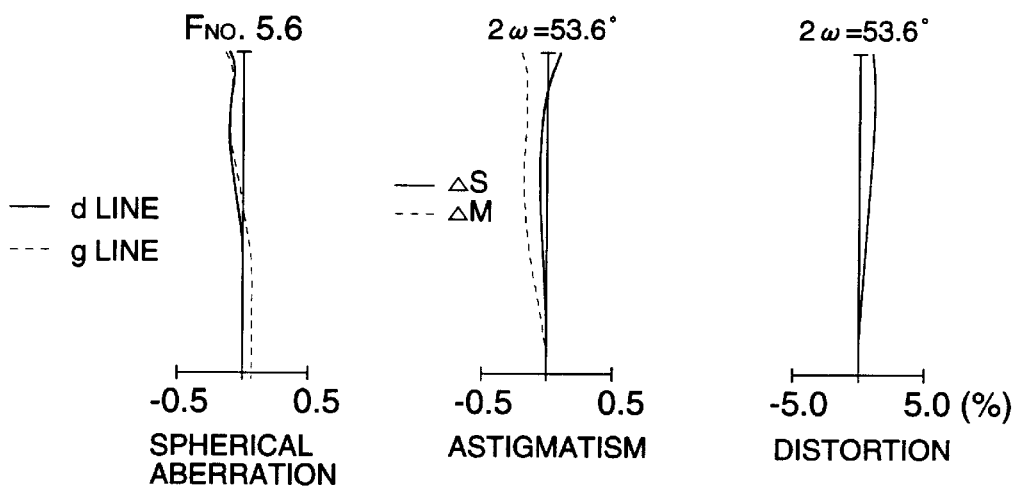
Figure 4:
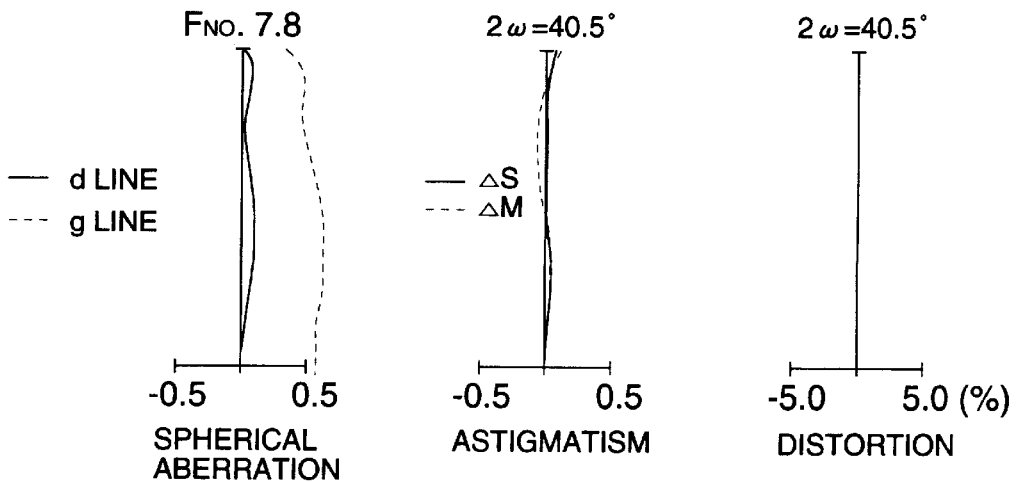

FIG. 3 is a sectional view of an optical axis of a lens corresponding to Example 2, and FIG. 4 shows aberration diagrams for spherical aberration, astigmatism and distortion for each of wide angle end position (a), intermediate position (b) and telephoto end position (c) corresponding to Example 1. In FIG. 3, the 1b lens subgroup is composed of two positive lenses. Optical data are shown in "Table 3" and "Table 4".

TABLE 3

$f = 24.7 - 33.9 - 46.8$
$F_{NO.} = 4.1 - 5.6 - 7.8$
$2\omega = 69.2° - 53.6° - 40.5°$
$f_B = 5.4 - 14.2 - 26.7$

| Surface No. | r | d | $n_d$ | $v_d$ |
|---|---|---|---|---|
| 1 | 13.903 | 1.50 | 1.66672 | 48.3 |
| 2 | 19.226 | 1.80 | | |
| 3 | −13.712 | 0.70 | 1.84666 | 23.8 |
| 4 | −32.681 | 2.60 | | |
| 5 | 20.140 | 2.00 | 1.62299 | 58.2 |
| 6 | −19.132 | 0.50 | | |
| 7* | −11.441 | 1.40 | 1.58913 | 61.2 |
| 8* | −9.098 | 6.70 − 3.48 − 1.10 | | |
| 9* | −24.000 | 2.00 | 1.49200 | 57.0 |
| 10* | −24.659 | 4.96 | | |
| 11 | −7.089 | 1.10 | 1.72916 | 54.7 |
| 12 | −17.364 | | | |

"*" given to Surface No. represents an aspheric surface. A diaphragm is located 1.4 mm behind the 4th surface.

TABLE 4

| Surface No. | Aspheric surface coefficient |
|---|---|
| 7th surface | K = 0.0<br>A4 = −4.47458 × 10⁻⁴<br>A6 = 2.26896 × 10⁻⁶<br>A8 = −1.18393 × 10⁻⁶<br>A10 = 6.56776 × 10⁻⁸ |
| 8th surface | K = 0.0<br>A4 = −1.59469 × 10⁻⁴<br>A6 = −3.79358 × 10⁻⁶<br>A8 = 5.38135 × 10⁻⁸<br>A10 = 7.64186 × 10⁻⁹ |
| 9th surface | K = 0.0<br>A4 = 1.61046 × 10⁻⁴<br>A6 = 6.09407 × 10⁻⁶<br>A8 = −2.69311 × 10⁻⁷<br>A10 = 3.57797 × 10⁻⁹ |
| 10th surface | K = 0.0<br>A4 = −2.73258 × 10⁻⁵<br>A6 = 2.33999 × 10⁻⁶<br>A8 = −1.30918 × 10⁻⁷<br>A10 = 1.36780 × 10⁻¹⁰ |

As shown in FIG. 4, all aberrations are corrected satisfactorily, resulting in an excellent lens system.

EXAMPLE 3

Figure 5:
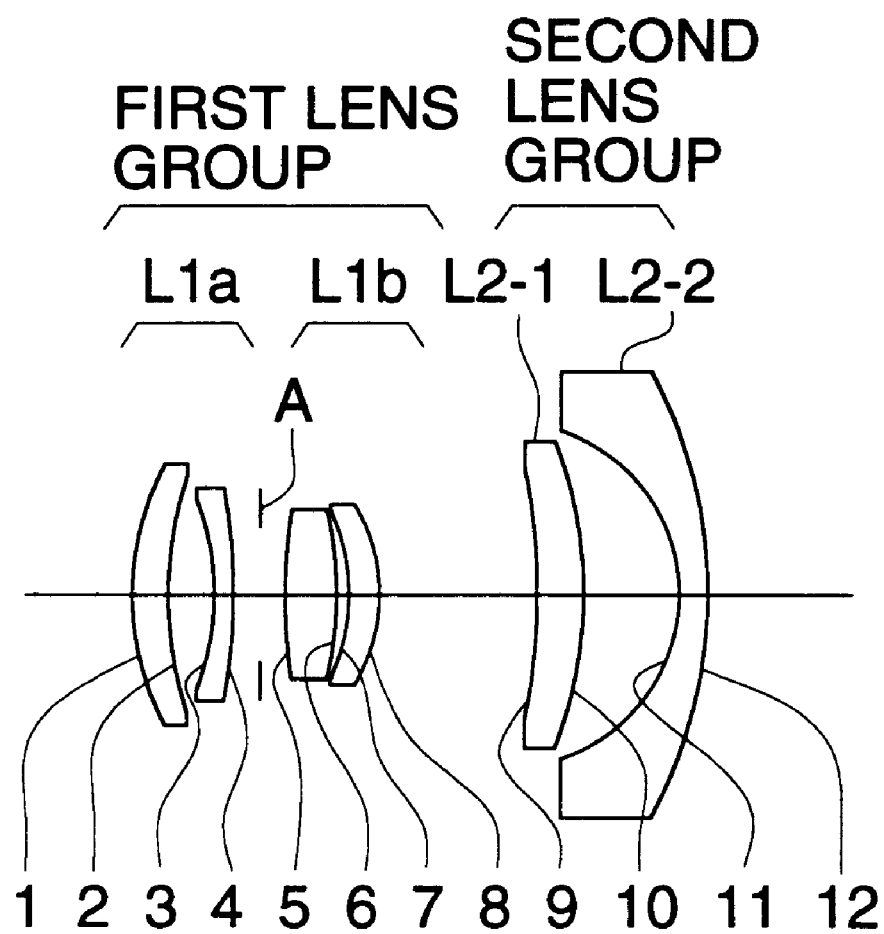
FIG. 5 is a sectional view of an optical axis of a lens corresponding to Example 3.
Figure 6A:
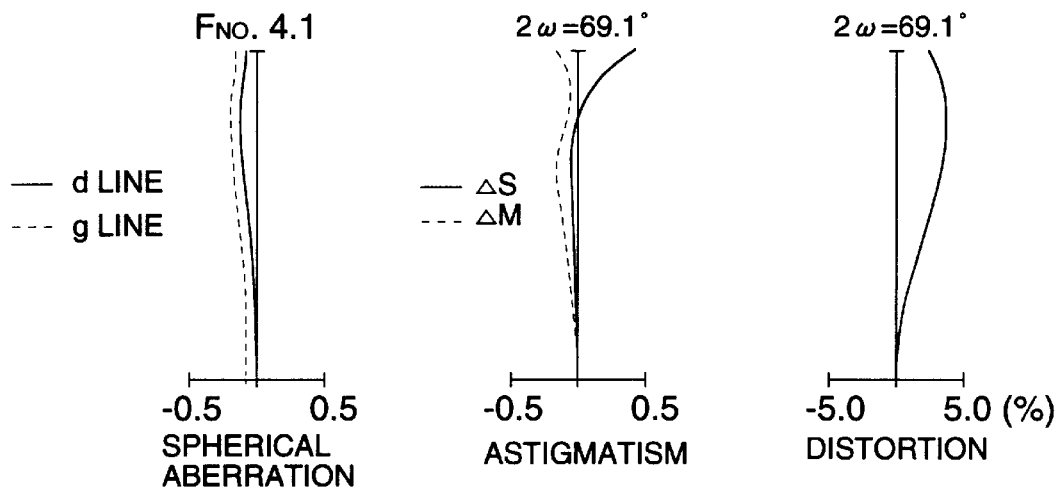
FIGS. 6(a), 6(b) and 6(c) show aberration diagrams for spherical aberration, astigmatism and distortion aberration for each of wide angle end FIG. 6(a), intermediate area FIG. 6(b) and telephoto end FIG. 6(c) corresponding to Example 3.
Figure 6B:
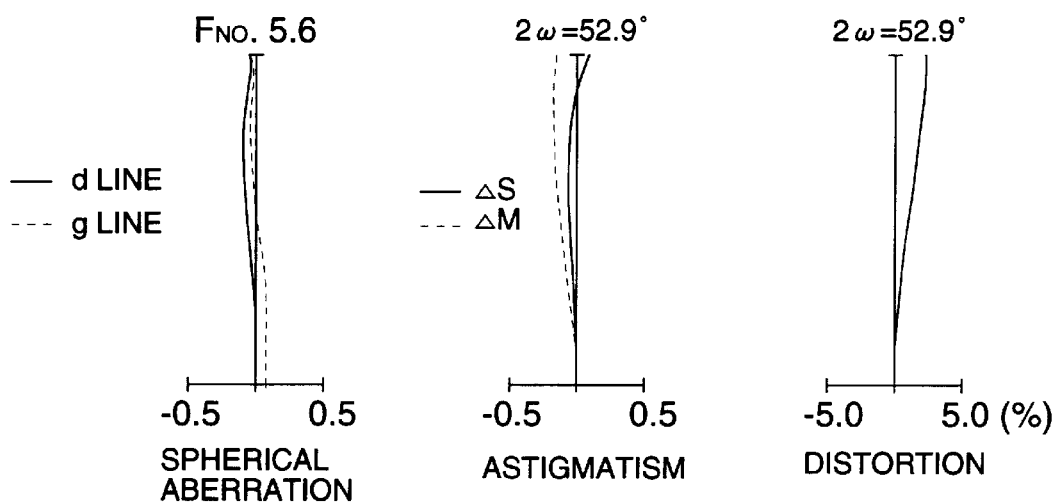
Figure 6C:
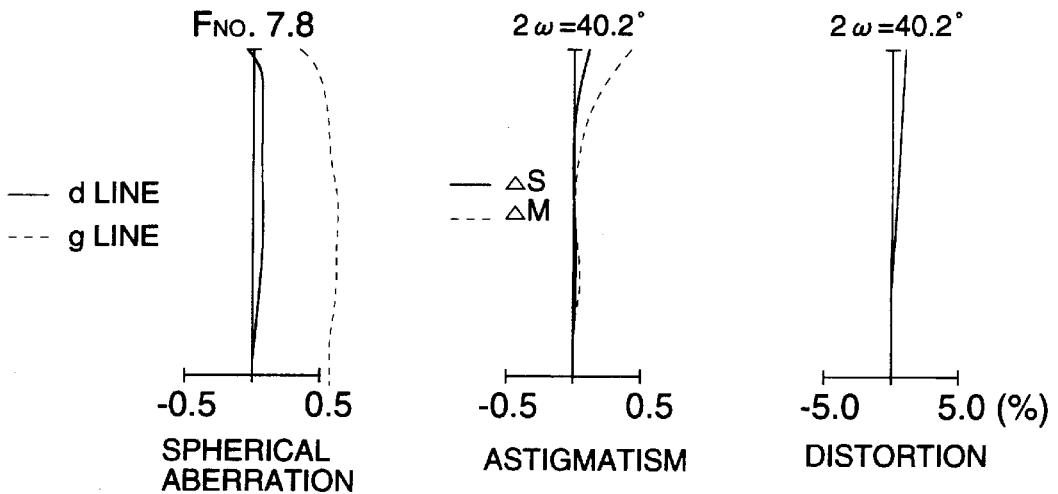

FIG. 5 is a sectional view of an optical axis of a lens corresponding to Example 3, and FIG. 6 shows aberration diagrams for spherical aberration, astigmatism and distortion for each of wide angle end position (a), intermediate position (b) and telephoto end position (c) corresponding to Example 3. In FIG. 5, the 1b lens subgroup is composed of two positive lenses. Optical data are shown in "Table 5" and "Table 6".

TABLE 5

$f = 24.7 - 34.0 - 46.8$
$F_{NO.} = 4.1 - 5.6 - 7.8$
$2\omega = 69.1° - 52.9° - 40.2°$
$f_B = 5.4 - 14.0 - 25.8$

| Surface No. | r | d | $n_d$ | $v_d$ |
|---|---|---|---|---|
| 1 | 14.129 | 1.50 | 1.66672 | 48.3 |
| 2 | 24.826 | 1.80 | | |
| 3 | −14.829 | 0.70 | 1.84666 | 23.8 |
| 4 | −41.122 | 2.60 | | |
| 5 | 26.799 | 2.00 | 1.62299 | 58.2 |
| 6 | −25.812 | 0.50 | | |
| 7* | −14.699 | 1.40 | 1.58913 | 61.2 |
| 8* | −9.163 | 6.96 − 3.71 − 1.36 | | |
| 9* | −25.932 | 2.00 | 1.49200 | 57.0 |
| 10* | −20.526 | 4.24 | | |
| 11 | −7.322 | 1.10 | 1.72916 | 54.7 |
| 12 | −23.179 | | | |

"*" given to Surface No. represents an aspheric surface. A diaphragm is located 1.4 mm behind the 4th surface.

TABLE 6

| Surface No. | Aspheric surface coefficient |
|---|---|
| 7th surface | $K = 3.14470 \times 10^{-4}$<br>$A4 = -6.45140 \times 10^{-4}$<br>$A6 = -7.98590 \times 10^{-6}$<br>$A8 = -7.57880 \times 10^{-7}$<br>$A10 = 3.42740 \times 10^{-8}$ |
| 8th surface | $K = 5.03530 \times 10^{-3}$<br>$A4 = -3.46960 \times 10^{-4}$<br>$A6 = -7.86930 \times 10^{-6}$<br>$A8 = 5.32570 \times 10^{-9}$<br>$A10 = 8.93500 \times 10^{-10}$ |
| 9th surface | $K = 1.91100 \times 10^{-4}$<br>$A4 = 1.45250 \times 10^{-4}$<br>$A6 = 4.46990 \times 10^{-6}$<br>$A8 = -7.83400 \times 10^{-8}$<br>$A10 = 1.78270 \times 10^{-9}$ |
| 10th surface | $K = 6.34220 \times 10^{-4}$<br>$A4 = -3.13350 \times 10^{-5}$<br>$A6 = 7.55190 \times 10^{-7}$<br>$A8 = -7.44560 \times 10^{-8}$<br>$A10 = 1.23660 \times 10^{-9}$ |

As shown in FIG. 6, all aberrations are corrected satisfactorily, resulting in an excellent lens system.

EXAMPLE 4

Figure 7:
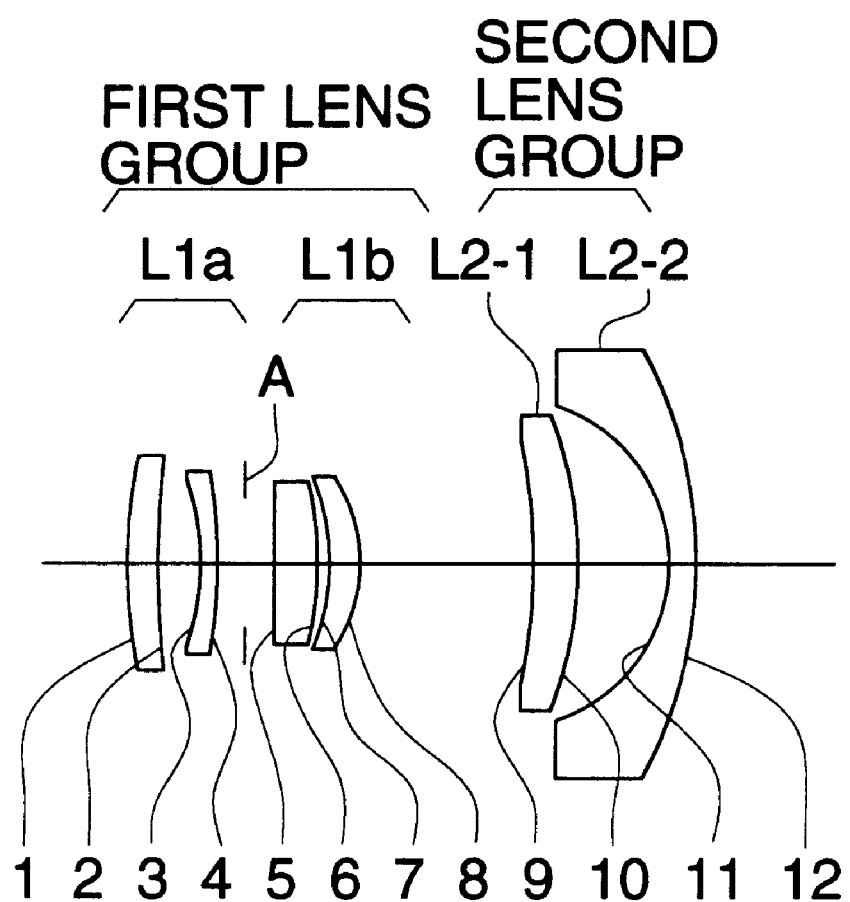
FIG. 7 is a sectional view of an optical axis of a lens corresponding to Example 4.
Figure 8:
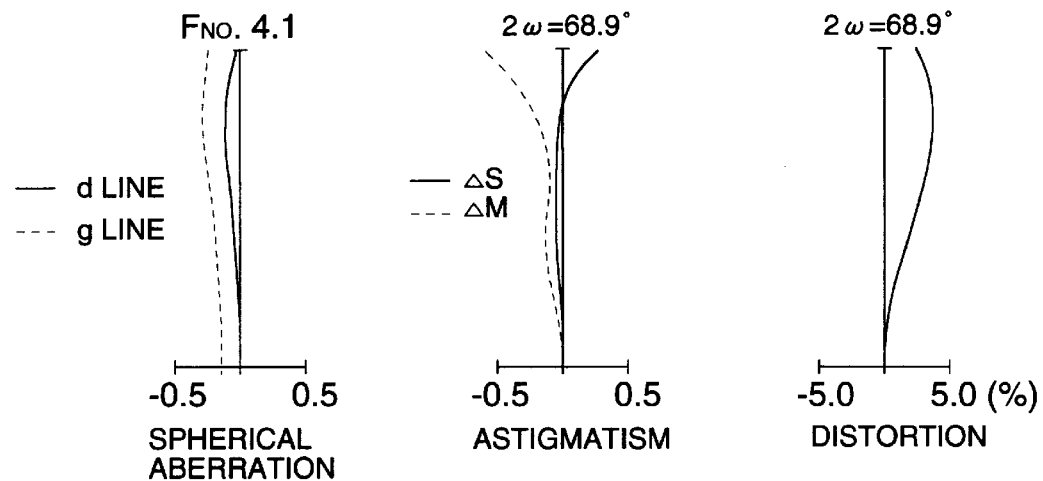
FIGS. 8(a), 8(b) and 8(c) show aberration diagrams for spherical aberration, astigmatism and distortion aberration for each of wide angle end FIG. 8(a), intermediate area FIG. 8(b) and telephoto end FIG. 8(c) corresponding to Example 4.
Figure 8:
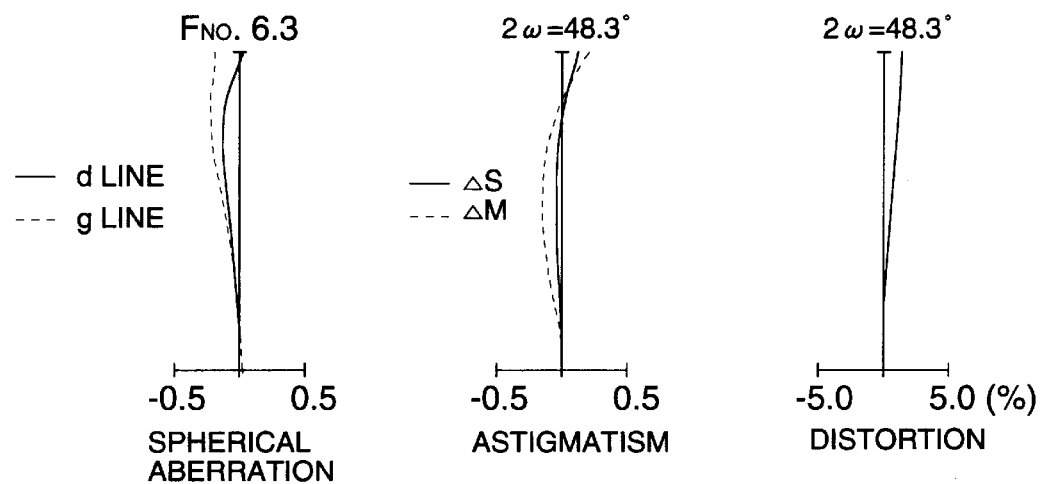
Figure 8:
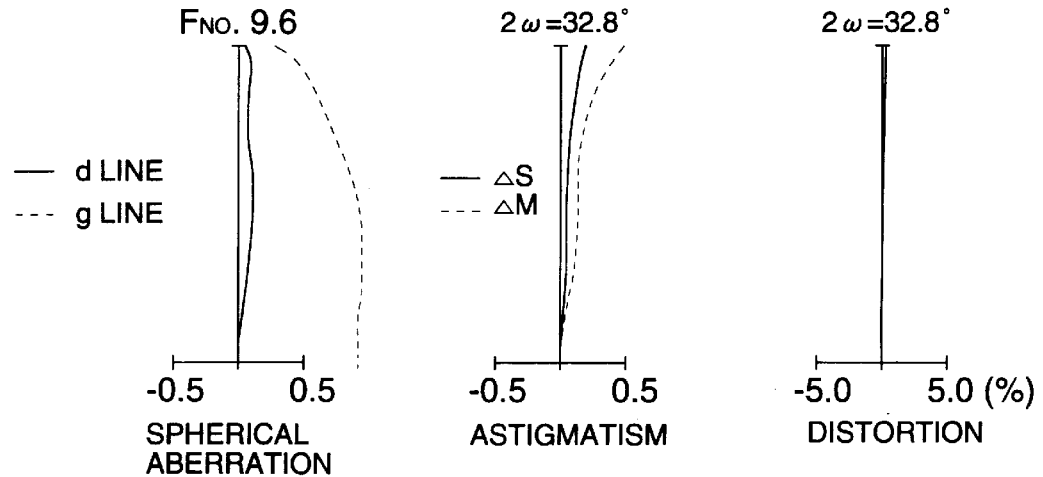

FIG. 7 is a sectional view of an optical axis of a lens corresponding to Example 4, and FIG. 8 shows aberration diagrams for spherical aberration, astigmatism and distortion for each of wide angle end position (a), intermediate position (b) and telephoto end position (c) corresponding to Example 4. In FIG. 7, the 1b lens subgroup is composed of two positive lenses. Optical data are shown in "Table 7" and "Table 8".

TABLE 7

$f = 24.7 - 37.9 - 58.5$
$F_{NO.} = 4.1 - 6.3 - 9.6$
$2\omega = 68.9° - 48.3° - 32.8°$
$f_B = 5.7 - 17.9 - 37.1$

| Surface No. | r | d | $n_d$ | $v_d$ |
|---|---|---|---|---|
| 1 | 21.072 | 1.50 | 1.67003 | 47.3 |
| 2 | 37.909 | 1.80 | | |
| 3 | −14.205 | 0.70 | 1.84666 | 23.8 |
| 4 | −31.218 | 2.60 | | |
| 5* | 59.608 | 2.00 | 1.62299 | 58.2 |
| 6 | −18.658 | 0.50 | | |
| 7 | −11.855 | 1.40 | 1.58913 | 61.2 |
| 8* | −7.575 | 7.86 − 3.94 − 1.36 | | |
| 9* | −23.787 | 2.00 | 1.49200 | 57.0 |
| 10* | −20.949 | 4.24 | | |
| 11 | −7.253 | 1.10 | 1.72916 | 54.7 |
| 12 | −21.690 | | | |

"*" given to Surface No. represents an aspheric surface. A diaphragm is located 1.4 mm behind the 4th surface.

TABLE 8

| Surface No. | Aspheric surface coefficient |
|---|---|
| 5th surface | $K = -1.76870 \times 10^{-4}$<br>$A4 = -4.88350 \times 10^{-4}$<br>$A6 = -9.08300 \times 10^{-6}$<br>$A8 = -5.43870 \times 10^{-7}$<br>$A10 = -2.26840 \times 10^{-8}$ |
| 8th surface | $K = 2.38310 \times 10^{-3}$<br>$A4 = -9.97550 \times 10^{-5}$<br>$A6 = -3.47560 \times 10^{-6}$<br>$A8 = -2.73340 \times 10^{-7}$<br>$A10 = -8.41970 \times 10^{-9}$ |
| 9th surface | $K = -7.97550 \times 10^{-3}$<br>$A4 = 2.11680 \times 10^{-4}$<br>$A6 = 5.55280 \times 10^{-6}$<br>$A8 = -3.05880 \times 10^{-8}$<br>$A10 = -2.74130 \times 10^{-9}$<br>$A12 = 3.97120 \times 10^{-11}$ |
| 10th surface | $K = -9.23110 \times 10^{-4}$<br>$A4 = 1.71170 \times 10^{-5}$<br>$A6 = 3.02190 \times 10^{-6}$<br>$A8 = -5.19400 \times 10^{-8}$<br>$A10 = -4.43010 \times 10^{-10}$<br>$A12 = -9.44580 \times 10^{-12}$ |

As shown in FIG. 8, all aberrations are corrected satisfactorily, resulting in an excellent lens system.

Values corresponding to the conditional expressions (1), (2), (3) and (4) mentioned above corresponding to Examples 1, 2, 3 and 4 are shown in following "Table 9".

TABLE 9

|  | L | fT | f1 | f1a | f2 | f2-1 |
|---|---|---|---|---|---|---|
| Example 1 | 45.8 | 46.7 | 17.4 | −37.7 | −16.8 | −28131.9 |
| Example 2 | 46.4 | 46.8 | 17.4 | −55.1 | −16.8 | 68907.9 |
| Example 3 | 45.0 | 46.8 | 17.8 | −84.5 | −16.5 | 178.4 |
| Example 4 | 56.3 | 58.5 | 17.3 | −63.9 | −16.1 | 289.6 |

|  | Conditional Formula (1) L/fT | Conditional Formula (2) fT/f1 | Conditional Formula (3) f1/\|f1a\| | Conditional Formula (4) f2/\|f2-1\| |
|---|---|---|---|---|
| Example 1 | 0.98 | 2.69 | 0.46 | 0.00 |
| Example 2 | 0.99 | 2.69 | 0.32 | 0.00 |
| Example 3 | 0.96 | 2.63 | 0.21 | 0.09 |
| Example 4 | 0.96 | 3.38 | 0.27 | 0.06 |

Based on the foregoing, the present invention makes it possible to provide a compact zoom lens suitable for a small-sized camera in which a magnification ratio is in a range of about 2–2.4, and aberrations are corrected satisfactorily for the entire range of the magnification while the wide field angle is being kept.

What is claimed is:

1. A zoom lens, comprising:

a first lens group, provided in an object side, having a positive refractive power; and a second lens group, provided in an image side from the first lens group, having a negative refracting power, wherein the zoom lens changes magnification by changing the distance between the first and second lens groups, the first lens group comprising a 1$a$ lens subgroup having a negative refracting power, said 1$a$ lens subgroup being the most object side lens subgroup of the first lens group, a diaphragm and a 1$b$ lens subgroup having a positive refracting power, all arranged in such order from the object side to the image side; and the zoom lens satisfying the following conditions:

$$7 < F/f_T < 1 \quad (1)$$

$$2.0 < f_T/f_1 < 4.2 \quad (2)$$

$$0.1 < f_1/|f_{1a}| < 0.6 \quad (3)$$

in which

L represents a distance between the image focal point of the zoom lens and the surface closest to the object side of the first lens group at a telephoto end position, $f_T$ represents a focal length of the zoom lens at the telephoto end position, $f_1$ represents a focal length of the first lens group, and $f_{1a}$ represents a focal length of the 1$a$ lens subgroup, wherein the second lens group consists of a (2-1)th plastic lens having an aspheric surface and a (2-2)th lens having a negative refracting power, and the (2-1)th lens and the (2-2)th lens are arranged in this order from the object side, and wherein a formula $|f_2/f_{2-1}| < 0.2$ in which $f_2$ represents a focal length of the second lens group and $f_{2-1}$ represents a focal length of the (2-1)th lens.

2. The zoom lens of claim 1, wherein the 1$b$ lens subgroup has at least one aspheric surface.

3. The zoom lens of claim 1, wherein the 1$b$ lens subgroup consists of a single lens having aspheric surfaces on both sides and having a positive refracting power.

4. The zoom lens of claim 1, wherein the formula $f_T/f_1$ satisfies the following condition:

$$2.4 < f_T/f_1 < 3.6$$

5. The zoom lens of claim 1, wherein the formula $f_1/|f_{1a}|$ satisfies the following condition:

$$0.15 < f_1/|f_{1a}| < 0.55.$$

* * * * *

UNITED STATES PATENT AND TRADEMARK OFFICE
CERTIFICATE OF CORRECTION

PATENT NO. : 5,933,284
DATED : August 3, 1999
INVENTOR(S) : Rika Narumi

It is certified that error appears in the above-identified patent and that said Letters Patent is hereby corrected as shown below:

Claim 1, col. 10, change "$7 < F/f_T < 1$" to

--$0.7 < L/f_T < 1$--

Signed and Sealed this

Ninth Day of May, 2000

Attest:

Q. TODD DICKINSON

Attesting Officer

Director of Patents and Trademarks